United States Patent
Roy

(10) Patent No.: US 12,169,562 B2
(45) Date of Patent: Dec. 17, 2024

(54) DOCKING METHOD AND A SYSTEM THEREOF TO AVOID SIDE-CHANNEL ATTACKS

(71) Applicants: Paritosh Roy, Lucknow (IN); RA SIDE CHANNEL CYBER SECURITY PRIVATE LIMITED, Lucknow (IN); RA CYBER SECURITY INCORPORATED, Newark, DE (US)

(72) Inventor: Paritosh Roy, Lucknow (IN)

(73) Assignee: RA CYBER SECURITY INCORPORATED, Newark, DE (US)

( * ) Notice: Subject to any disclaimer, the term of this patent is extended or adjusted under 35 U.S.C. 154(b) by 412 days.

(21) Appl. No.: 17/501,686

(22) Filed: Oct. 14, 2021

(65) Prior Publication Data

US 2022/0035913 A1 Feb. 3, 2022

Related U.S. Application Data

(63) Continuation of application No. PCT/IB2020/062104, filed on Dec. 17, 2020.

(30) Foreign Application Priority Data

Dec. 18, 2019 (IN) .............................. 201911052660

(51) Int. Cl.
*H04L 9/00* (2022.01)
*G06F 21/55* (2013.01)
(Continued)

(52) U.S. Cl.
CPC ............ *G06F 21/556* (2013.01); *H04L 9/002* (2013.01)

(58) Field of Classification Search
CPC ..... G06F 21/556; G06F 21/755; H04L 9/002; H04L 9/003
See application file for complete search history.

(56) References Cited

U.S. PATENT DOCUMENTS

2011/0040977 A1\* 2/2011 Farrugia ............... H04L 9/0662
713/181
2015/0222421 A1\* 8/2015 Guo ........................ H04L 9/003
380/28

(Continued)

FOREIGN PATENT DOCUMENTS

WO WO-2016168926 A1 \* 10/2016 ............. G06F 7/582

OTHER PUBLICATIONS

Zecheng He, Ruby B. Lee; "How secure is your cache against side-channel attacks?"; 2017 50th Annual IEEE/ACM International Symposium on Microarchitecture (Micro); Year: Oct. 2017 | Conference Paper | Publisher: IEEE; pp. 341-353 (Year: 2017).\*

(Continued)

*Primary Examiner* — Fatoumata Traore
*Assistant Examiner* — Courtney D Fields
(74) *Attorney, Agent, or Firm* — Cozen O'Connor

(57) ABSTRACT

The present invention relates to a method for avoiding side-channel attacks by providing variable amount of computation using permutation puzzles. The side-channel attacks depend on the implementation of the encryption algorithms rather than their execution. The method provided in the present invention protects an already existing encryption system or any arbitrary electronic device from side channel attacks by providing a random amount of execution time, random amount of power consumption and/or random electromagnetic emissions for different iterations of the corresponding operation.

19 Claims, 10 Drawing Sheets

(51) Int. Cl.
    *G06F 21/60*     (2013.01)
    *G06F 21/70*     (2013.01)
    *H04L 9/06*     (2006.01)
    *H04L 9/30*     (2006.01)

(56) References Cited

U.S. PATENT DOCUMENTS

2017/0063535 A1*   3/2017   Brown ................... H04L 9/3006
2018/0316487 A1*  11/2018   Choi ....................... H04L 9/003

OTHER PUBLICATIONS

International Search Report for PCT/IB2020/062104, mailed Apr. 5, 2021, 3 pages.
Written Opinion for PCT/IB2020/062104, mailed Apr. 5, 2021, 6 pages.
Dhandabani Rajavel et al: Six-face cubical key encryption and decryption based on product cipher using hybridisation and Rubik's cubes, IET Networks, vol. 7, No. 5, Sep. 1, 2018, pp. 313-320, ISSN: 2047-4954, DOI: 10.1049.

* cited by examiner

DOCKING METHOD AND A SYSTEM THEREOF TO AVOID SIDE-CHANNEL ATTACKS

FIELD OF THE INVENTION

The present invention relates to a docking method to avoid side-channel attacks by providing random amount of computation using permutation puzzles.

BACKGROUND OF THE INVENTION

Data, information and its computation are critical components of the system. The leakage of such confidential components can be hazardous and results in loss of information and confidentiality breach. The leakage of such critical information can be caused during transmission and/or encryption or decryption process or from an arbitrary digital system. The information leakage can be useful for attackers to extract the secret data through side channel analysis.

Side channel attacks or implementation attacks involve reverse engineering process where the leakage/emissions during transmissions or encryption-decryption process, if accessed and analyzed by the attacker leads to the original message by reverse engineering the emissions involved. These attacks treat cipher-based cryptanalysis as gray box cryptanalysis wherein the conversion of plain text to cipher text and/or cipher text to plain text results in information leakage. This leaked information is used by the attacker to decipher the encrypted message and therefore leads to the original message.

Also, different keystrokes when pressed on an input keypad correspond to different values of emissions which can be reverse engineered by the attacker to predict which keystrokes were pressed on the keypad by the host victim. There are also several other ways in which side-channel analysis can be performed. However, every type of side channel analysis is based on the way the computation is performed, i.e., side channel analysis depends on the amount of computation done by the system, cache accesses made by the system during the computation and/or the path followed by the electric signal within a digital logic circuit when doing a certain type of computation.

Also, when a remote car key sends a signal to its authorized vehicle to open the door lock or perform any other such operation, an unauthorized entity may listen and record the corresponding signal and later on use it to unlock the respective vehicle as the particular vehicle would be unable to identify the source. Many other types of such attacks exist and also put the developing IoT technology at risk. The proposed docking method can also be used in such cases to mask the computation with a sufficiently large range of different random noises for different instances of the same operation performed.

Side-channel attacks depend on the implementation of the encryption algorithms rather than their execution. They depend on the physical factors rather than the confidential keys used in encryption. The most targeted vulnerability of a digital system to side-channel attacks is the amount of computation done.

The cited prior art document US20110040977A1 relates to a computer data security field, to cryptographic sponge and hash function processes which are embodied in a computer system and are typically keyless, but highly secure. The processes are based on the type of randomness exhibited by manipulation of the well-known three dimensional Rubik's cube puzzle. Computation of the hash or sponge value (digest) is the result of executing in a model (such as computer code or logic circuitry) an algorithm modeling such a puzzle using the message as an input to the cube puzzle algorithm, then executing the cube puzzle algorithm. A state of the modeled cube puzzle (the final cube puzzle arrangement) after execution gives the sponge or hash digest value of the message. However, the said prior art is a method of providing pseudo random amount of fluctuating computations associated with random amount of emissions wherein the obtained results do not provide any insights to the design of how the execution of the state of the modeled cube puzzle giving the sponge or hash digest value of the message is able to provide with a method of providing random amount of computation associated with random amount of emissions and therefore fails to provide security from side channel attacks.

The cited prior art document US20180316487 relates to an apparatus and method for performing operation and providing security against side channel attack. The apparatus and method generate values equal to values obtained through an exponentiation operation or a scalar multiplication operation of a point using values extracted from previously generated parameter candidate value sets and an operation secured against side-channel attack, thereby improving security against side-channel attack without degrading performance. However, in the cited prior document the degree of randomness is much greater than the obtained results. Also, the degree of randomness may be scaled up without the addition of any significant overhead.

Thus, a solution is required to reduce side channel attacks and control on the amount of computations. The proposed method avoids side-channel attacks by providing a protected amount of computation to the already existing encryption system. However, the proposed method may be extended to be used in other digital/analog electronics system.

Objectives of the Invention

The primary objective of the present invention is to provide a method for avoiding side-channel attacks by providing variable amount of computation using permutation puzzles.

Yet another objective of the present invention is to provide a solution to the problem of side-channel attacks wherein a logical circuit takes an input value and produces the same output value by implementing random amount of computation.

Yet another objective of the present invention is to provide implementation of the encryption algorithms rather than their execution to avoid side channel attacks by producing different random paths between input and output nodes for same input values for different iterations.

Yet another objective of the present invention is to provide a solution and pave a way of creating Hardware Security Modules (HSMs) which could provide security from side channel attacks.

Yet another objective of the present invention is to provide a scalable degree of randomness with comparatively very low overhead added.

Yet another objective of the present invention is to mask the critical information with random amount of computation in such a way that random amount of power and electromagnetic reading is recorded by the potential attacker for the same operation at different iterations and to provide a way where same operation takes a random amount of time to compute when performed in different iterations.

Another objective of the present invention is to provide a method having a polynomial bounded time complexity for solving a permutation puzzle for better results.

Yet another objective of the present invention is to create an N-dimensional mesh using a number of permutations of the permutation puzzle and associating the mesh with a set of characters/operations.

Other objectives and advantages of the present invention will become apparent from the following description taken in connection with the accompanying drawings, wherein, by way of illustration and example, the aspects of the present invention are disclosed.

BRIEF DESCRIPTION OF DRAWINGS

The present invention will be better understood after reading the following detailed description of the presently preferred aspects thereof with reference to the appended drawings, in which the features, other aspects and advantages of certain exemplary embodiments of the invention will be more apparent from the accompanying drawings in which.

SUMMARY OF THE INVENTION

Figure 1A:
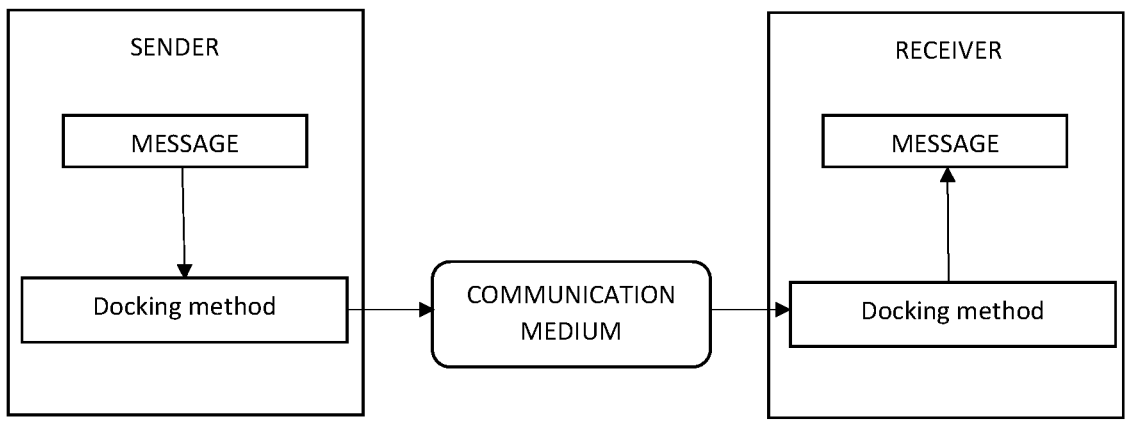
FIG. 1A, FIG. 1B and FIG. 1C illustrate the usage of the proposed docking method within a communication system.

The present invention relates to a method for avoiding side-channel attacks by providing variable amount of computation using permutation puzzles.

The method for avoiding side channel attack by solving a permutation puzzle used in the present invention has a polynomial time complexity for fast computation times and increased randomness.

In the present invention, an N-dimensional mesh is created using different states of permutations of the permutation cube/indices. The different permutations associated with the indices of the mesh may or may not be same. The mesh created using permutation cubes is considered as a virtual display and indices are substituted as pixels (each index in the created mesh is a permutation of the respective permutation cube). The permutations involved in the system are used to modify the amount of CPU based computations being performed and to add security from side channel attacks to a digital system.

Further, in the present invention, the protected amount of computation which is provided by the disclosed method can be implemented in a controlled way to some extent. The method of the present invention can be modified according to the requirements of a digital system. For example, if a reduction between the amount of computation when different actions are performed is required, or if a single action is required to have variable/different amount of computation at different iterations, both of the above requirements can be met by the proposed method.

DETAILED DESCRIPTION OF THE INVENTION

The following description describes various features and functions of the disclosed device and methods with reference to the accompanying figures. In the figures, similar symbols identify similar components, unless context dictates otherwise. The illustrative aspects described herein are not meant to be limiting. It may be readily understood that certain aspects of the disclosed system, method and apparatus can be arranged and combined in a wide variety of different configurations, all of which are contemplated herein.

These and other features and advantages of the present invention may be incorporated into certain embodiments of the invention and will become more fully apparent from the following description and claims or may be learned by the practice of the invention as set forth hereinafter.

Accordingly, those of ordinary skill in the art will recognize that various changes and modifications of the embodiments described herein can be made without departing from the scope of the invention. In addition, descriptions of well-known functions and constructions are omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention are provided for illustration purpose only and not for the purpose of limiting the invention.

It is to be understood that the singular forms "a," "an," and "the" include plural referents unless the context clearly dictates otherwise.

It is to be understood that the terms "cipher text" and "plain text" can be a character from any known formal languages, an x-bit word sequence, or any set of characters in general.

It is to be understood that the terms "permutation puzzle" and "permutation cubes" refer to any arbitrary puzzle having multiple permutation states. Rubik's cube is a well-known example of a permutation puzzle/permutation cube.

It should be emphasized that the term "comprises/comprising" when used in this specification is taken to specify the presence of stated features, integers, steps or components but does not preclude the presence or addition of one or more other features, integers, steps, components or groups thereof.

In accordance with the present invention, the side-channel attacks depend on the implementation of the encryption algorithms rather than their execution. They depend on the physical factors rather than the cryptographic keys used for the process of encryption. Implementation of side-channel attacks requires an attacker to be in the vicinity of the target/host system. However, the method disclosed in the present invention protects an already existing encryption system or any arbitrary electronic device from side channel attacks by providing a random amount of execution time, power consumption and/or electromagnetic emissions for different iterations of the corresponding operation.

In accordance with the present invention the values of the Electromagnetic radiations, the sound released (acoustic cryptanalysis), amount of power monitored or other physical factors which results in leakage of information and makes the system vulnerable to side-channel attacks depending on the logic of the corresponding circuit or number of comparisons performed by the system during computation, i.e., the amount of computation depends on the number of comparisons made by the respective system. The disclosed method uses permutation puzzles to provide random computation to an existing system, thus, avoiding side-channel analysis.

In accordance with the present invention the permutation cubes correspond to permutation puzzles, for example, a 3×3×3 permutation cube/Rubik's cube. The puzzle is a cube (has 6 colored faces) and is made of plurality of mini cubes. The number of mini-cubes depends on the size of the cube used. For example, in a classical 3×3×3 Rubik's cube, the main cube has at least 26 mini-cubes, or other example being a 5×5×5 permutation cube based on similar principles is made of at least 98 mini-cubes.

In accordance with the present invention, other types of variants are also known having mini-cubes arranged as 2×2×2, 5×5×5, 2×3×4, 3×3×5, etc. There are also non-rectangular variations which may exist but are not limited to pyramids, tetrahedron, octahedron, icosahedron and dodecahedron.

In an exemplary embodiment of the present invention, a classical 3×3×3 Rubik's cube is capable of having approximately 4.34 quintillion ($4.34 \times 10^{19}$) different permutations. The size of the permutation cube depends on the shape of the puzzle and the number of mini-cubes. For example, 5×5×5 permutation cube or Professor's cube (having 6 colored faces) has approximately $2.83 \times 10^{74}$ different permutations which is much greater than the number of different permutations possible on a 3×3×3 Rubik's cube.

In an exemplary embodiment of the present invention, the number of rotations/moves required to solve a permutation puzzle from one permutation to another depends on the algorithm used in solving the puzzle. For example, if brute force method is used, then the number of rotations/moves required to solve a classical 3×3×3 Rubik's cube from one permutation to another does not exceed 20 which is the minimum number of moves/rotations to solve any permutation of a classical 3×3×3 Rubik's cube. However, in most cases, every method having a polynomial bounded time complexity used in solving a Rubik's cube from one permutation to another permutation may require the number of rotations/moves to exceed 20. This difference in the number of moves/rotations required in solving a permutation puzzle is the underlying concept of providing the random amount of computation, as some permutations may require less computations to obtain the desired results while some permutations may require more computation to do the same depending on the state of the permutation puzzle used.

In accordance with the present invention, the brute force methods are not favored as the amount of computation required to solve a permutation puzzle using brute force will be the same for most of the computations, and also, amount of computation required will also be high while using a brute force method. The methods for solving a permutation puzzle used in the present invention will have a polynomial bounded time complexity for fast computation times and increased randomness.

Further, in the present invention, an N-dimensional mesh is created using a number of permutations of the permutation puzzle and is associated with a set of characters/operations. The N-dimensional mesh can be understood as a collection of points/indices where these indices represent different permutation states of a permutation puzzle. The N-dimensional mesh may be of any arbitrary shape, i.e., a 2-D mesh may be a straight line, square or any other two dimensional shape, or a 3-D mesh may be a cube, a sphere or of any other three dimensional shape. The N-dimensional mesh may be represented as a collection of some (N−1)-dimensional meshes, (N−1)-dimensional meshes can be represented as a collection of (N−2)-dimensional meshes, 3-dimensional mesh can be represented as a collection of 2-dimensional meshes, and so on. Each index of the mesh is represented by a state of the corresponding permutation puzzle used. A set is formed having all the indices of the created N-dimensional mesh. A subset of the created set (the set that contains all the indices with which the N-dimensional mesh is formed) stores some or all indices of the mesh and are referred to as selected indices or activated pixels. The permutations corresponding to all the selected indices are solved from one permutation state to other permutation state.

The present invention discloses a system for implementing a docking method comprising: an input buffer port (702, 802) for receiving a message and a processor having a value assignment module (711, 811), mesh formation module (712, 812) and an operation module (713, 813). The processor is coupled to a permutation puzzle logic module (721, 821) for modifying the permutation state, by using a permutation puzzle algorithm; a permutation storage (723, 823) for storing the permutation states of the permutation puzzle algorithm; a plurality of permutation buffers (724, 725, 824); an initial permutation buffer (724) configured to store the permutation state assigned to the input data in value assignment module (711, 811). Further, a growth function module (752, 852) is coupled to the value assignment module (711, 811) and is configured to store the growth functions of the input values; the mesh formation module (712, 812) is configured to receive input from Initial Permutation Buffer (724) and Growth Function Logic module (752, 852) to create N-dimensional mesh; a mesh storage buffer (760, 860) is configured to store the N-dimensional mesh; an operation storage buffer (771, 871) to store the operation for forming the N-dimensional mesh; an operation Module (713, 813) to receive input from Mesh Storage Buffer (760, 860) and Operation Storage Buffer (771, 871) to create new permutation state (731, 831); a final permutation buffer (725) to store the new permutation (731, 831) and a consistency check module (740) may be configured to check presence of inconsistencies which may or may not arise within the system.

Figure 1B:
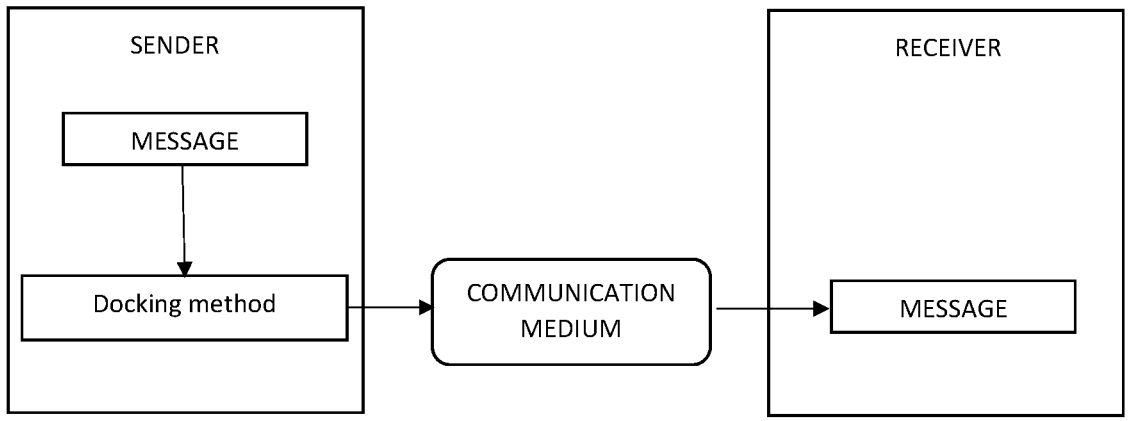
Figure 1C:
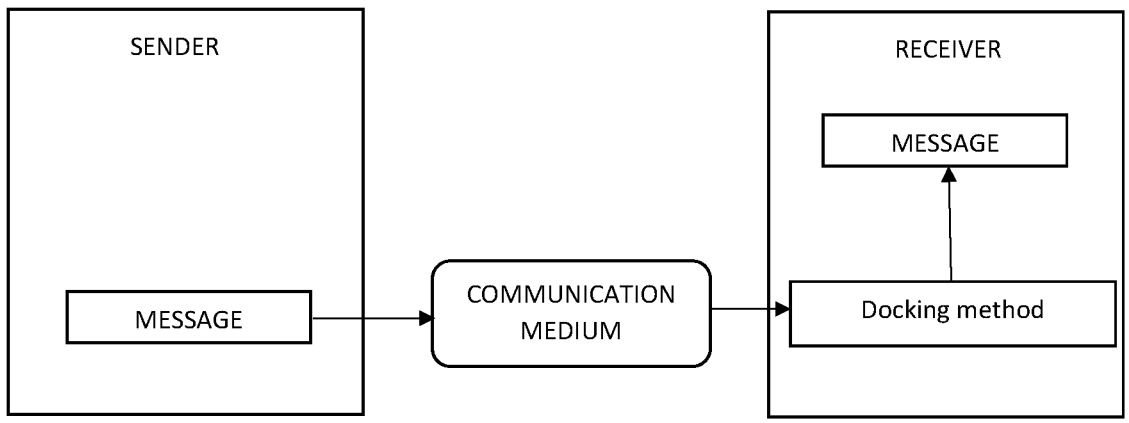

The main embodiment of the present invention, as shown in FIG. 1A, FIG. 1B and FIG. 1C, is a docking process which provides protection to the respective communication systems against side channel analysis. The MESSAGE as shown in the corresponding figures may be a set of characters from any known formal languages, or may be an arbitrary operation, or may represent digital/analog signals.

In accordance with the present invention and as illustrated in FIG. 1A, the message taken as input by the docking method, is associated with a set of operations, which then produces an output. This output is sent to the receiver through the communication channel where the message is again processed by the docking method. The presence of the docking method in the sender and receiver depends on the functionality required by the end user. FIG. 1A, FIG. 1B and FIG. 1C show the different ways in which the docking method may be used within a communication system. The docking method may be present in both the sender and receiver's nodes as shown in FIG. 1A, or in the sender's side only as shown in FIG. 1B, or in the receiver's side only as shown in FIG. 1C.

FIG. 1A illustrates that the output produced by the docking method may or may not be the same depending on the input taken by it and a consistency check is required to verify that the output text produced by the docking method is consistent with the input text entered into the system.

As illustrated in FIG. 1B and FIG. 1C, the output produced by the docking method and the input taken by it are required to be the same and hence, no consistency check may be required here.

Initialization of the proposed docking method: In the present invention the docking method when used by the system will require to share the data (among the sender and the receiver) regarding the different parameters responsible for providing security from side-channel attacks. At least one of the parameters used in the proposed docking method is to be kept confidential among the sending and receiving entity. The information about which growth functions were used, the dimensions of the mesh, etc., are to be shared among the sender and receiver initially. At the time of sharing of such confidential information, it is to be assumed that the security system has not been compromised.

The initialization process can be done at the time of manufacturing or at the time when the docking system is required to function along with the existing communication system. Initialization process may or may not be done more than once depending on the functionality of the corresponding system.

Figure 2A:
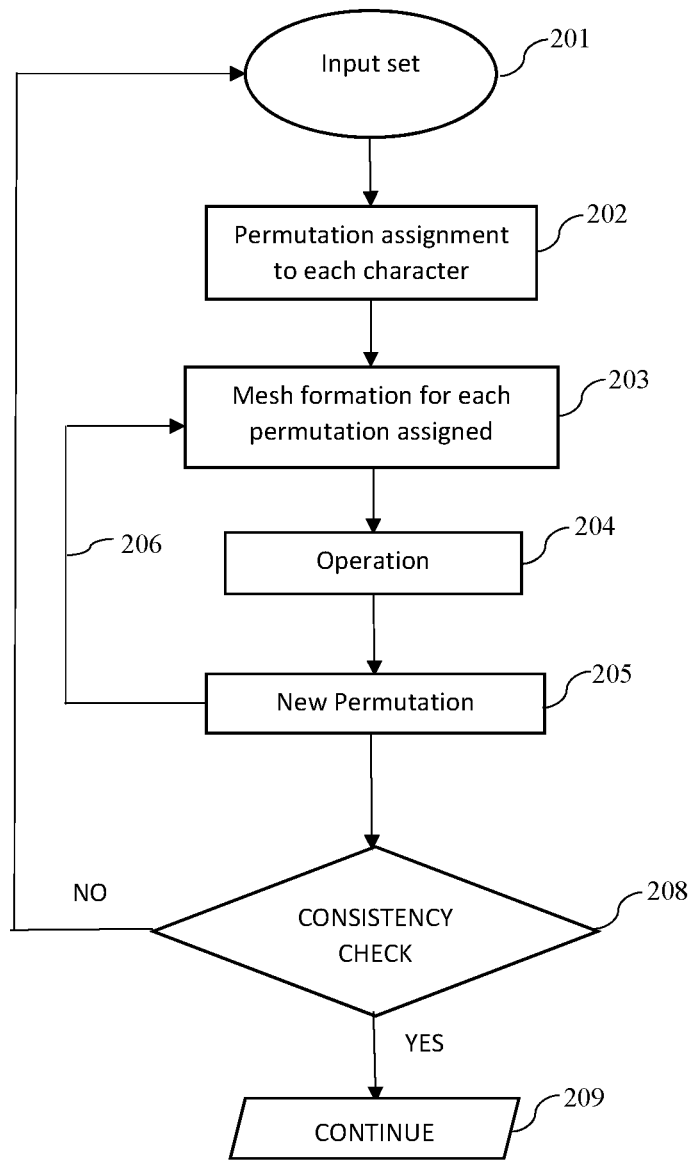
FIG. 2A and FIG. 2B illustrate the schematic flow diagram of the working of the docking process responsible for providing protected amount of computation.

In accordance with the present invention FIG. 2A shows the flow diagram explaining the working of the proposed docking method which includes a consistency check. The terms used in the flow chart are further discussed below in the description:

A. Input Set (201): The input set (201) is a set of all the characters as standardized by the UCS (Universal Character Set) or may be a set of operations or may be a set of signals which are used by the corresponding system.

B. Permutation Assignment (202, 212): Each character or a set of characters from the input set (201) which are in use by the corresponding system are assigned a permutation of the permutation puzzle. The permutation assigned to a character is the prime permutation of the respective set of characters. Permutation assignment (202, 212) is done according to the requirements of the system to which the proposed method is docked.

C. An N-dimensional mesh (203) is formed for each prime permutation using a collection of growth methods along different axes.

D. Operations (204, 214) are performed on the mesh (203, 213) which yield computations whose amount may or may not be different for different characters and different instances.

E. New Permutations (205, 216) produced by the Operations (204, 214) are the new prime permutations assigned to the input set (201). A new mesh (203, 213) is created for each character for the next iteration (206, 217).

F. A consistency check (208) is done to determine the consistency of the system. If the system is inconsistent, then reassignment of characters takes place, i.e., the input set (201) are again assigned random permutations, growth methods, a plurality of operations to be performed on mesh, which may or may not be different from the previous assignment. If the system is consistent, then no reassignment of the parameters occurs and the system continues 209 with the desired actions.

Figure 2B:
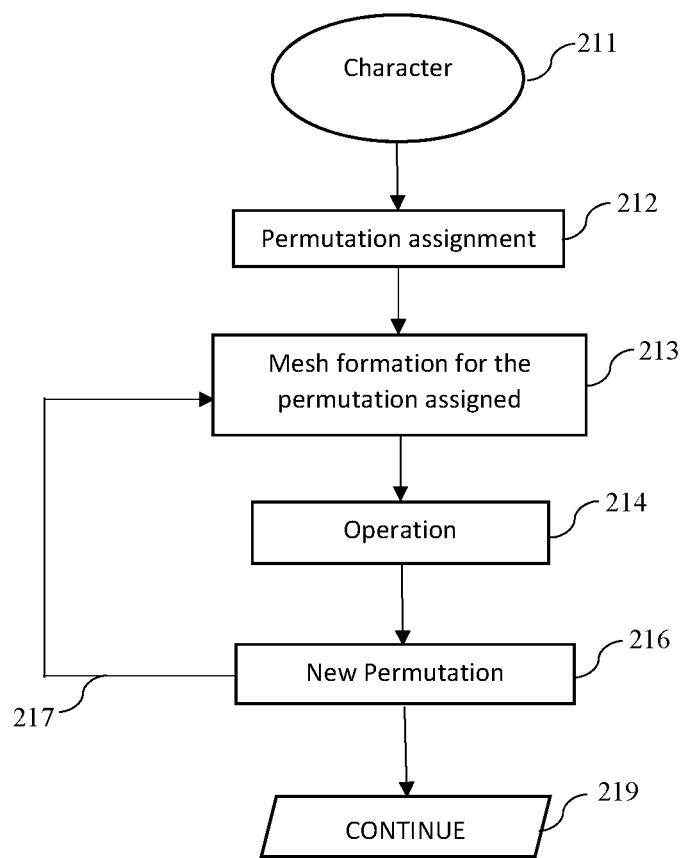

In an exemplary embodiment of the present invention FIG. 2B illustrates the schematic diagram of a flow chart explaining the working of the proposed docking method which does not include a consistency check (208). The terms used in the flow chart are further discussed below:

A. Character (211): The character (211) may be a character belonging to the set of characters as standardized by the UCS (Universal Character Set), or it may correspond to a digital signal.

B. Permutation Assignment (202, 212): The character (211) is assigned a permutation of the permutation puzzle. The permutation assigned to a character is the prime permutation of that character at that particular instance. Permutation assignment (202, 212) is done according to the requirements of the system to which the proposed method is docked.

C. An N-dimensional mesh (203, 213) is formed for each prime permutation using a collection of growth methods along different axes.

D. Operations (214) are performed on the mesh (203, 213) which yield computation whose amount may or may not be different for different input sets (201) and different instances.

E. A New Permutation (216) is produced by the Operations (204, 214) which is the new prime permutation assigned to the particular character (211) and the character (211) is sent to the receiver (Continue 219). A new mesh is created for the next iteration (217).

Figure 3A:
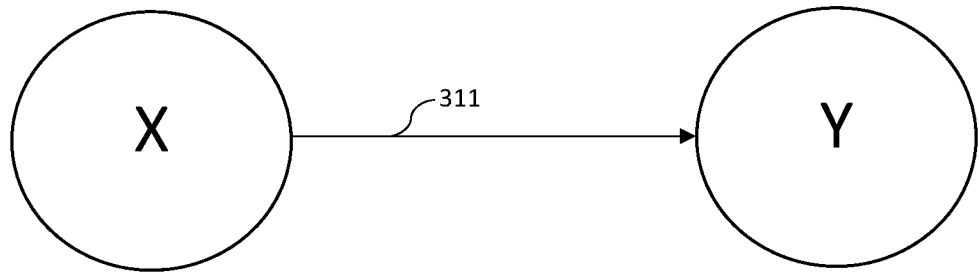
FIG. 3A, FIG. 3B, FIG. 3C, FIG. 3D, and FIG. 3E illustrate the method of solving a permutation puzzle from one given permutation to another permutation in polynomial bounded time complexity.

An exemplary embodiment of the present invention FIG. 3A illustrates two different permutation states X and Y of an arbitrary permutation puzzle. The set of moves (317) succeeded by set of moves (318) assumed here to be "S" when performed on the permutation state X yield the permutation state Y. The permutation state I in FIG. 3B, FIG. 3C and FIG. 3D is the ideal permutation state of the corresponding permutation puzzle and is used as a reference permutation which help in attaining a polynomial bound time complexity for transforming one permutation state of a permutation puzzle to another permutation state.

Figure 3B:
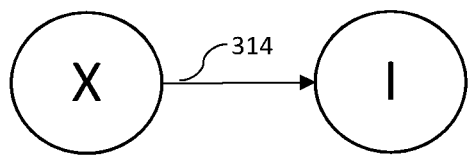

FIG. 3B shows the permutation state X yielding the ideal permutation state I after applying the ordered set of moves (314) assumed here to be "XI".

Figure 3C:
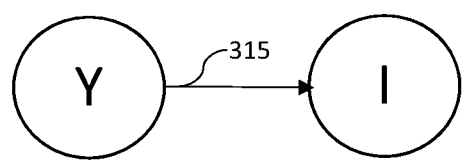

FIG. 3C shows the permutation state Y yielding the ideal permutation state I after applying the ordered set of moves (315) assumed here to be "YI".

Figure 3D:
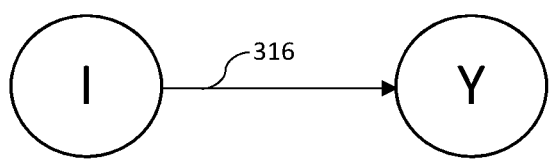

FIG. 3D shows the ideal permutation state I after applying the ordered set of moves (316) assumed here to be "IY". The reversing of the order of the elements/moves in the set "YI" and replacing all the moves within the set "YI" with their respective complements yields the set "IY". An example of the complement of the moves respective to a permutation puzzle can be understood as: clockwise and anti-clockwise rotations complementing each other.

Figure 3E:
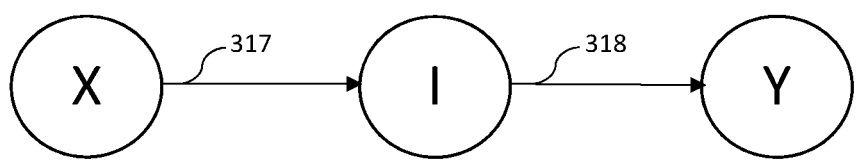

FIG. 3E shows the transformation of the permutation state X to permutation Y using the ideal permutation state I as a temporary permutation or a reference permutation. As depicted in FIG. 3E, the set of moves "XI" (317) and "IY"

(318) are concatenated and then applied to the permutation state X to yield the permutation Y.

Figure 4A:
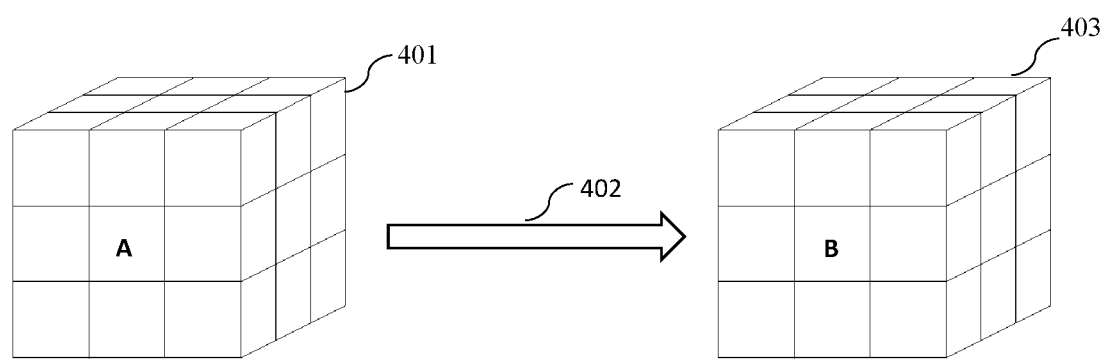
FIG. 4A and FIG. 4B illustrate the growth function and the growth axis respectively, formed using a 3×3×3 Rubik's cube as an example.

Growth Function: The growth functions establish a relationship between two or more permutations of a permutation puzzle and facilitates the growth of the mesh (the mesh is made of permutations of the permutation puzzle). An example of the growth function which uses a 3×3×3 Rubik's cube as the permutation puzzle is shown in the FIG. 4A. Further, the growth function computes the set of moves/rotations (402) (referred to as M) required to solve the permutation A (401) of the designated puzzle to permutation B (403) and this set M is used iteratively on each obtained permutation and on a specified axis (known as growth axis (419) in FIG. 4B. The set of moves (M, 402) is again and again applied on the permutations obtained on each step to obtain new permutations (216) along the specified axis.

Growth axis (419): The growth method (specified by the corresponding system) is applied to a given permutation along a specified axis. This specified axis is the growth axis (419). In an exemplary embodiment, the growth axis (419) is shown in the FIG. 4B. Here, the set of moves/rotations (M, 402) is applied on the permutation A (411) to obtain permutation B (413) and then on permutation B (413) to obtain permutation C (415) and finally obtaining permutation D (417). In yet another exemplary embodiment shown in FIG. 3B, the size of the growth axis is 3 because 3 new permutations are obtained by applying the set of moves (M, 402) iteratively on the permutation A (411). Permutation A (411), permutation B (413), permutation C (415) and permutation D (417) may or may not be different which depends on the set of moves (M, 402) and the value of permutation A (the permutation which is the origin of the growth axis).

Mesh formation: A collection of growth methods along growth axes forms a mesh made up of permutations of the permutation puzzle. The formation of the mesh depends on the growth method with the permutations of the permutation puzzle as its building blocks, i.e., the indices of the mesh are in form of the permutations of the permutation puzzle.

Figure 4B:
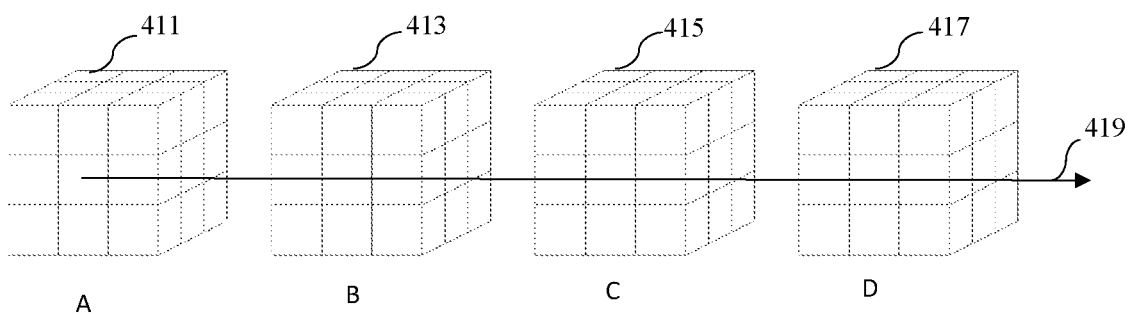

In an exemplary embodiment of the present invention, a mesh as explained above can be formed is shown in FIG. 5A. The classical 3×3×3 Rubik's cubes are used as permutation puzzles. A two-dimensional mesh of dimension 5×5 having 25 indices (permutations) and eight growth functions are used in FIG. 5A. Four axes namely the X, Y, −X and −Y are used to represent a coordinate plane with the prime permutation/cube as the origin of this two-dimensional plane. The prime permutation is shown in FIG. 4B. The other four axes namely the P, Q, R and S are the diagonal axes on the (X, Y), (−X, Y), (X, −Y) and (−X, −Y) quadrants respectively. There are eight growth functions required to form the mesh on the prime permutation. Let the growth function associated with axes X, P, Y, Q, −X, R, −Y and S be G1, G2, G3, G4, G5, G6, G7 and G8 respectively. These growth functions may or may not be different.

Figure 5A:
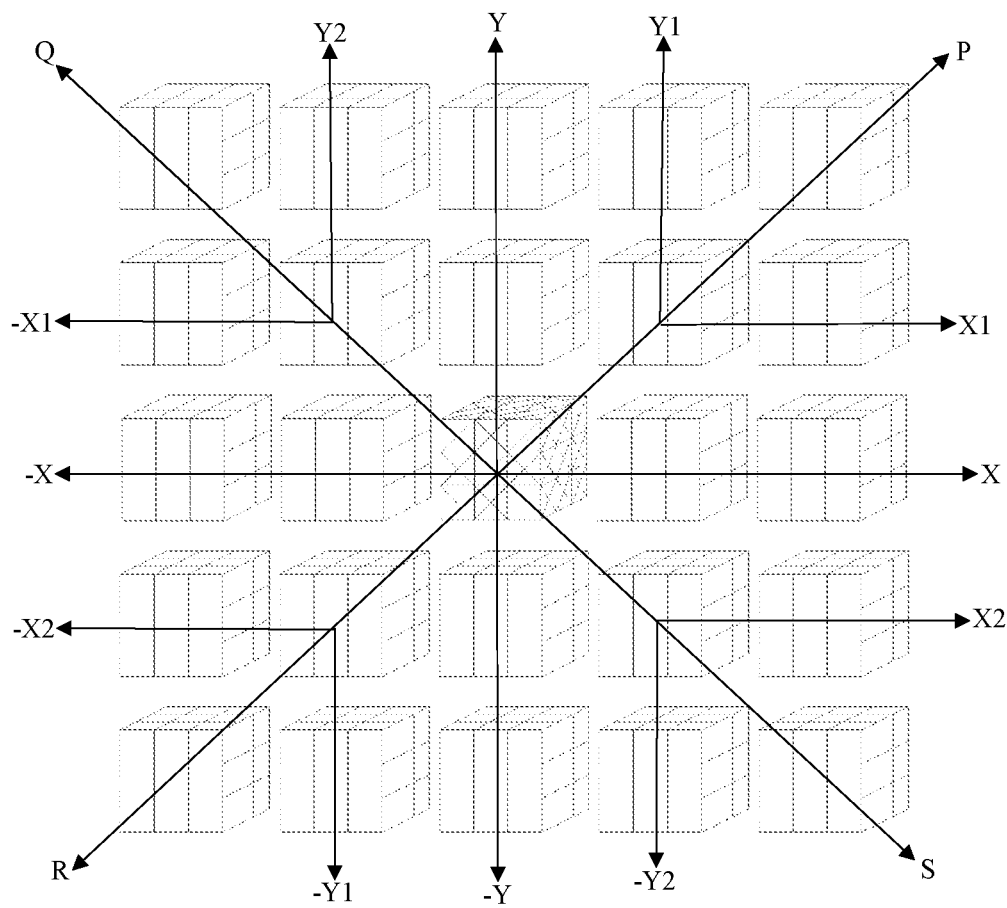
FIG. 5A illustrates an example related to formation of a mesh by using a 3×3×3 classical Rubik's cube for the permutation puzzle.
Figure 5B:
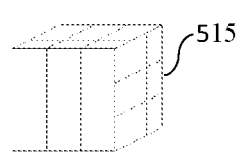
FIG. 5B, FIG. 5C and FIG. 5D illustrate the various diagrams representing functions of the different states of permutations of the Rubik's cube as illustrated in the example of FIG. 5A.

However, there are sixteen growth axes used in the example shown in FIG. 5A. The X, Y, −X, −Y, P, Q, R and S being the eight growth axes as stated above and the other eight growth axes are namely X1, Y1, −X1, Y2, −X2, −Y1, X2 and −Y2. The growth function used in growth axes X1 and X2 is the same as the one used in growth axis X. The growth function used in growth axes Y1 and Y2 is the same as used in growth axis Y. The growth function used in −X1 and −X2 is the same as the one used in the growth axis −X. The growth function used in −Y1 and −Y2 is the same as the one used in −Y.

Further in the present invention, the growth function for any particular axes can change if required by the system. In an exemplary embodiment of the present invention, G1 can correspond to axes P, G2 can correspond to Y, G3 can correspond to Q and so on in the next iteration, or the growth functions corresponding to different axes can be swapped in the next iterations depending on the requirements of the system.

Figure 6:
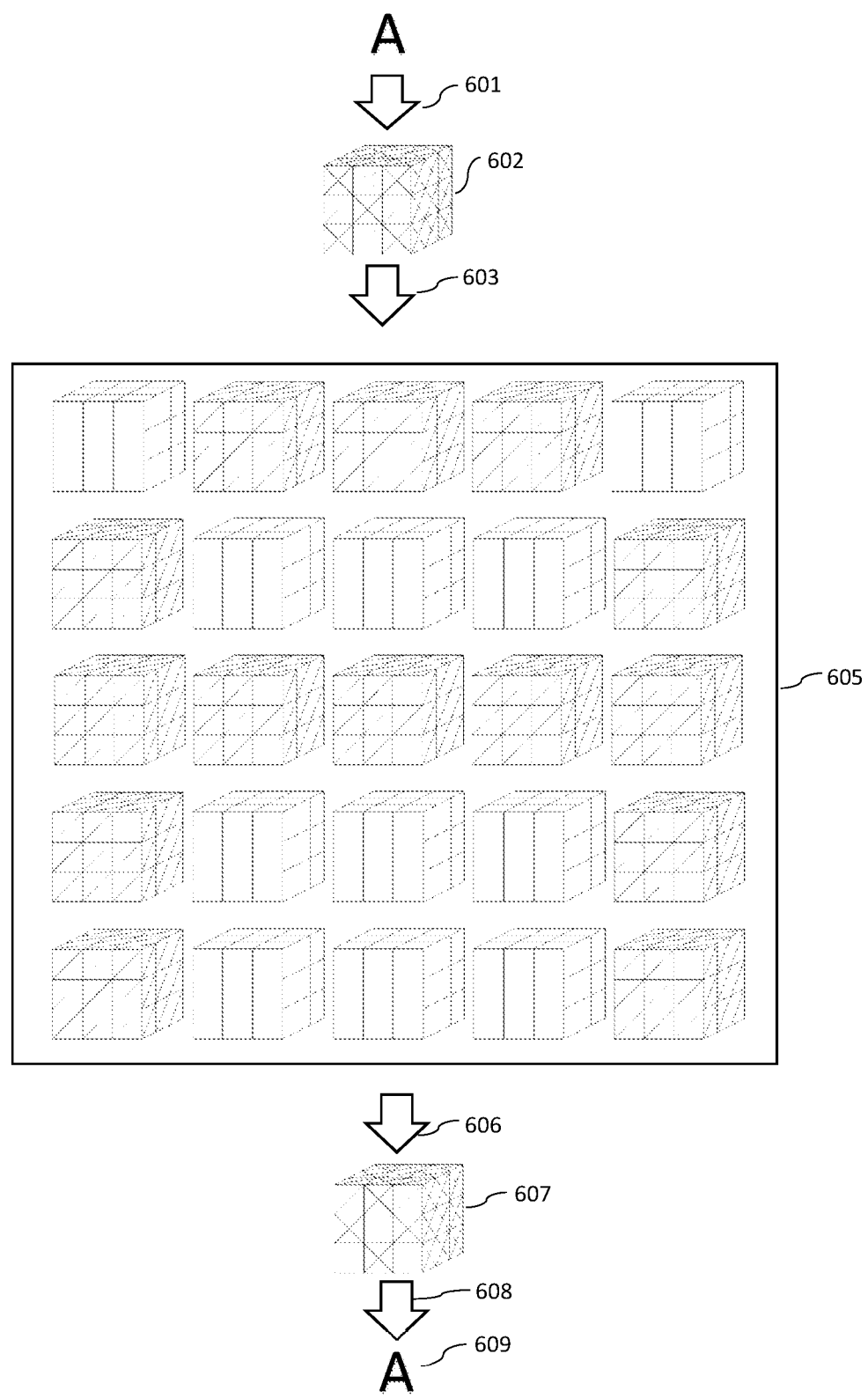
FIG. 6 illustrates an example disclosing the working of the proposed docking method on a character.

Operations: Here the selection of specified set of permutations from all the permutations defined in the mesh takes place. All the selected permutations are solved in accordance to the definition of the system and the set of moves/rotations associated with the solution of all the permutations is then applied to the prime permutation. FIG. 6 shows an example of operations performed on a 5×5 mesh formed by using permutations of a classical 3×3×3 Rubik's cube.

Reference permutation: The reference permutation is a permutation state to which all the selected permutations are solved and the set of moves required to transform a selected permutation to the reference permutation are applied to the prime permutation. Reference permutations may or may not be different for different prime permutations.

Figure 5C:
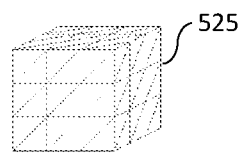
Figure 5D:
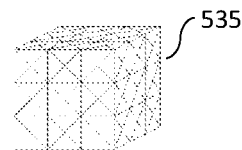

In accordance with the present invention FIG. 6 illustrates, a single character "A" which is assigned (601) a permutation of the 3×3×3 Rubik's cube. This permutation is the prime permutation (602) of the character "A". The prime permutation is represented by the diagram in FIG. 5D (535). The growth functions as shown by an example in FIG. 4B and FIG. 4C are used to create a 5×5 mesh which can be understood by referring to the example shown in FIG. 5A. The shaded set of permutations are the selected permutations as shown using the diagram in FIG. 5C (525). Another exemplary embodiment of the present invention as shown in FIG. 6 illustrates, the selected permutations in the 5×5 mesh which are the ones used to display the corresponding character (in this case, the character being "A"). A permutation of the 3×3×3 Rubik's cube is used as a reference permutation. Reference permutation is a permutation state of the used permutation puzzle which may or may not be different from the prime permutation. All the selected Rubik's puzzle permutations are solved to the reference permutation and the set of moves associated with their solution is applied to the initial prime permutation, thus resulting in a new permutation state (731, 831) of the prime permutation assigned to the character "A" which may or may not be different from the initial prime permutation assigned. Also, the state of the previously assigned prime permutation which may or may not be changed after applying the set of operations.

The operations performed on character "A" as shown in FIG. 6 are to be performed on both the sender and receiver side for consistency (if the proposed docking method is being used at both the sender and receiver ends). This will become apparently clearer during the explanation of an example encompassing all the figures including FIG. 6, FIG. 7 and FIG. 8.

Figure 7:
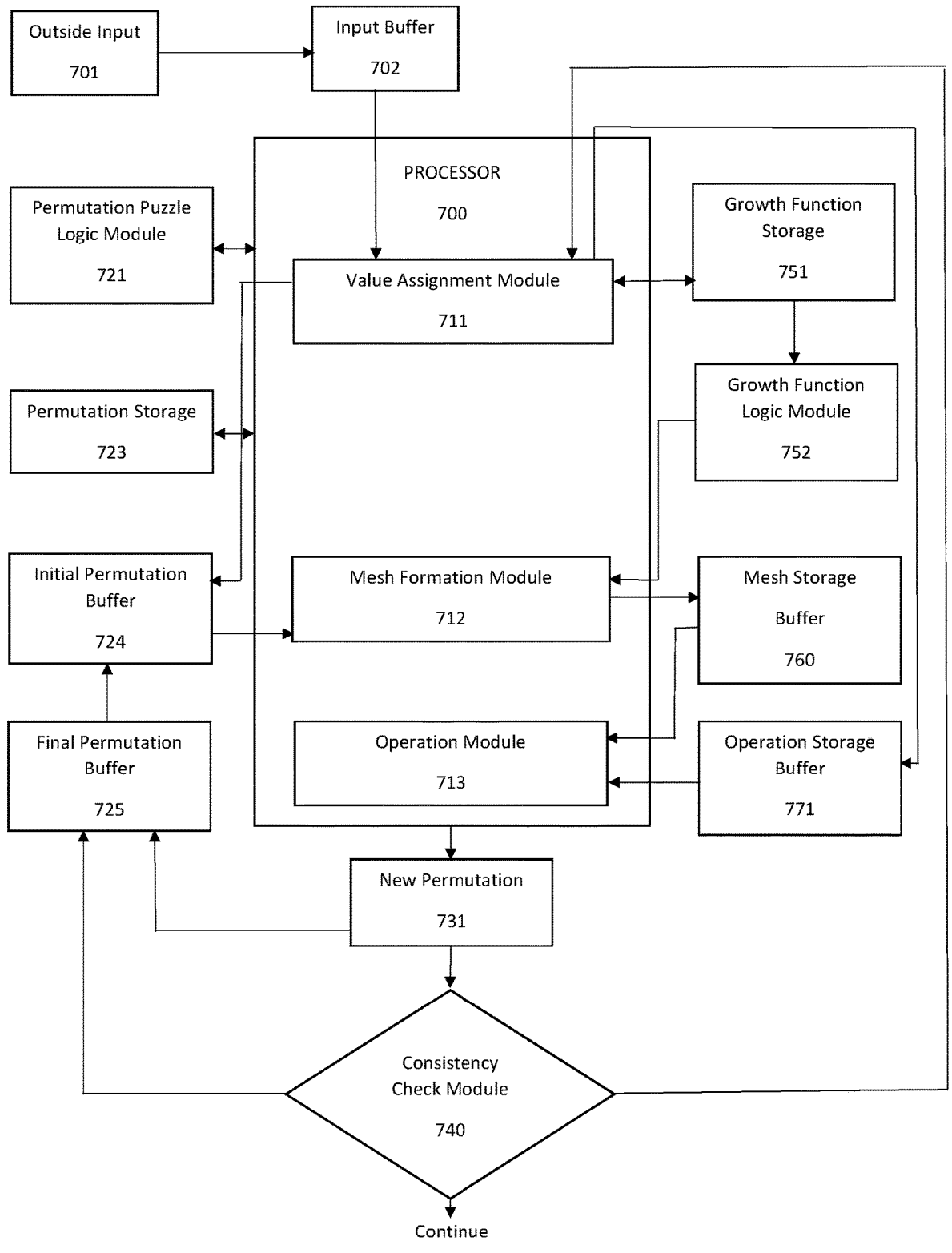
FIG. 7 and FIG. 8 illustrates the diagram of the apparatus of the proposed docking method.
Figure 8:
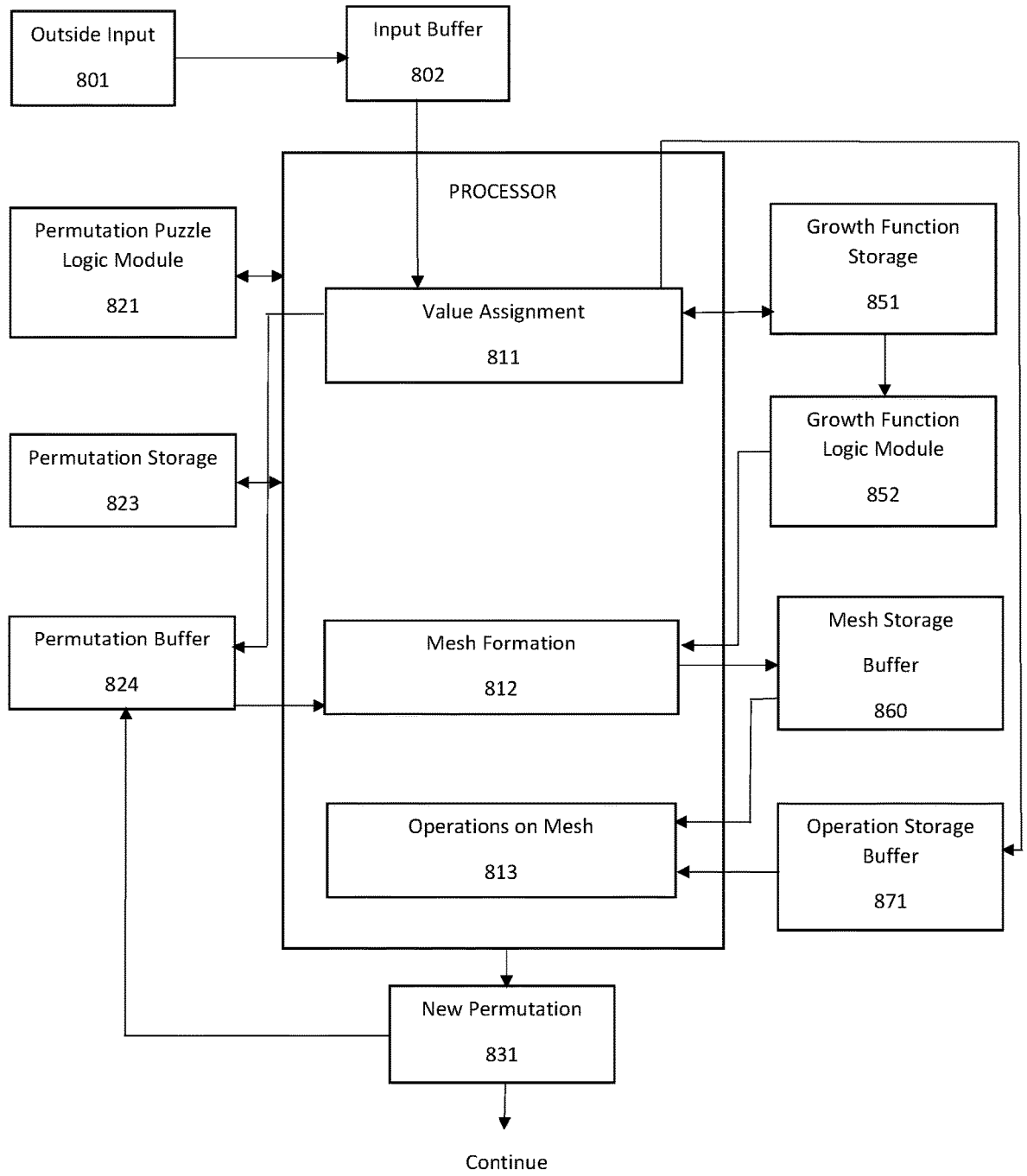

In accordance with the present invention as illustrated in FIG. 7 and FIG. 8, an outside input (701, 801) is provided to the disclosed system and is temporarily stored in input buffer (702, 802). The input may correspond to a set of characters, signals or any operation in general.

In Value Assignment Module (711, 811), the data stored in the input buffer port (702, 802) is assigned with values which include a permutation state of the corresponding permutation puzzle and the growth functions from the Growth Function Storage (751, 851). The set of operations to be performed on the mesh may also be assigned to the input data from the Input Buffer port (702, 802) in Value Assignment Module (711, 811).

The permutation state assigned to the input data in Value Assignment Module (711, 811) will be here known as prime permutation state or prime permutation. The prime permutation assigned is stored in Initial Permutation Buffer (724).

Permutation Puzzle Logic Module (721, 821) takes a permutation state of the permutation puzzle as input and produces an output permutation state. Permutation Puzzle Logic Module (721, 821) contains the information of solving the permutation puzzle from one permutation state to another. The information used may be a set of instructions/code (written in any programming language) or may correspond to the equivalent logic circuitry.

Permutation Storage (723, 823) has all the relevant permutation states of the corresponding permutation puzzle stored.

Mesh Formation Module (712, 812) takes the prime permutation from Initial Permutation Buffer (724) and growth functions from Growth Function Logic Module (752, 852) as input and creates an N-dimensional mesh, where 'N' is a natural number. The created mesh is then stored in Mesh storage Buffer (760, 860).

Operation Module (713, 813) takes the mesh stored in Mesh Storage Buffer (760, 860) and the corresponding operation to be performed stored in Operation Storage Buffer (771, 871) as input, performs operations on the mesh and creates a new permutation state (New Permutation (731, 831) as output.

Final Permutation Buffer stores the value of the New Permutation (731, 831) generated.

A consistency check is performed by the Consistency Check Module (740) in order to check for inconsistencies within the system. If the system is deemed consistent, the value of Final Permutation Buffer (725) overwrites the value in Initial Permutation Buffer (724) or else, the reason for inconsistency is checked by the system and value assignment is again done in Value Assignment Module (711, 811).

Consistency Check (208): This segment of the code or equivalent logic circuitry checks for the inconsistencies and determines whether the message is desirable by the system to send to the receiver or not. Consistency check (208) involves parameters that are dependent on the design of the mesh, the permutations assigned and the desired result that is to be expected by the corresponding system. If the parameters of the sending and receiving nodes are consistent, then the message/signal can be sent by the sender to the receiver, else the permutation assignment to the character set is again done which may be different from the previous permutation assignment.

In accordance with the present invention, a message is deemed to be undesirable to be sent by the sender to the receiver, i.e., the system is inconsistent, if the prime permutations of the respective characters are different at the given instance and as a result, the receiver will be unable to recognize the message sent by the authorized sender.

If a situation occurs wherein the message is deemed to be inconsistent by the receiver or the sender, then re-assignment of the prime permutations and/or the growth functions is to be done.

Consistency check (208) may also include the flow control methods which are responsible for maintaining consistency between sender and receiver nodes in a communication system. Flow control methods may include sliding window protocols like Stop and Wait ARQ, Go Back-N ARQ or Selective Repeat ARQ as per the requirements of the system The flow control methods use the concept of sending and receiving acknowledgements to maintain consistency between sender and receiver nodes within a communication system.

Figure 9:
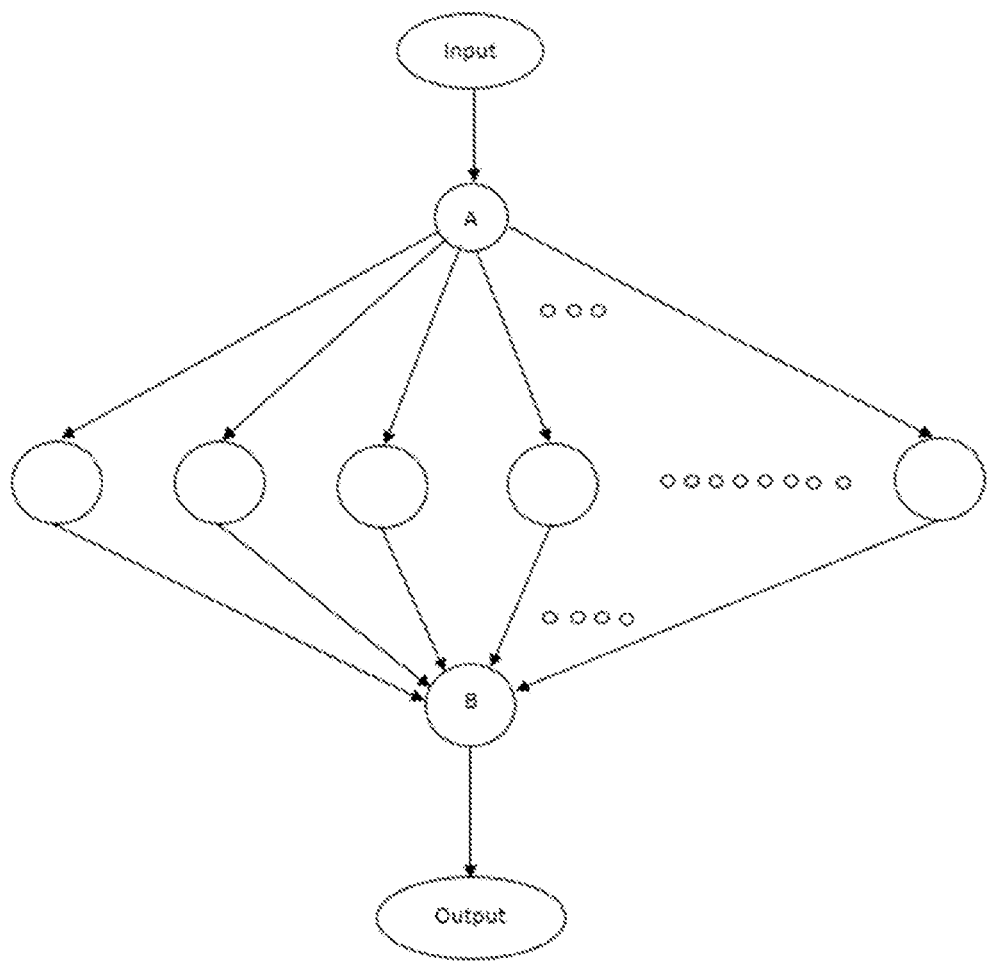
FIG. 9 illustrates the method for solving permutation puzzle.

In FIG. 9, the working of Permutation Puzzle Logic Module (721, 821) is depicted using a graph. There exist more than one paths from node A to node B. Here each node represents a permutation state of the permutation puzzle used. The Permutation Puzzle Logic Module (721, 821) transforms the permutation state from node A to node B via a path which is determined by the value of the source, target permutations and the algorithm with which the permutation puzzle is to be solved from node A to node B. Every permutation state of the permutation puzzle when solved to a particular permutation state has an exclusively distinct path associated with it. Each path has its own Electromagnetic signature, power signature and acoustic signature associated with it.

In accordance with the present invention displaying a figure on the mesh does not hold any physical relevance to it and is only as a reference system for designing a programmable code or designing a logic circuitry that would produce results as stated by the method.

The present invention implements a docking method performed by the system to prevent side-channel attacks, wherein the method includes the steps of:

(a) receiving an outside input message (701, 801);

(b) storing the received input message (701, 801) in an input buffer port (702, 802);

(c) assigning the permutation state of the input message (701, 801) in a value assignment module (711, 811);

(d) storing the received permutation state of the input message (701, 801) in an initial permutation buffer (724);

(e) applying a permutation puzzle algorithm to the permutation state in a permutation puzzle logic module (721, 821) coupled to a processor;

(f) modifying and storing the permutation state in permutation storage (723, 823) coupled to the processor;

(g) storing growth functions in a growth function storage (751, 851) and applying logic to the growth functions in a growth function logic module (752, 852);

(h) creating an N-dimensional mesh in Mesh Formation Module (712, 812) and receiving input from initial permutation buffer (724) and growth function module (752, 852);

(i) storing the N-dimensional mesh in Mesh Storage Buffer (760, 860);

(j) receiving input from mesh storage buffer (760, 860) and operation storage buffer (771, 871)

(k) performing a plurality of operations on the received input of mesh storage buffer (760, 860) and operation storage buffer (771, 871) in an operation module (713, 813)

(l) creating a new permutation (731) as output of the processor and storing the new permutation in the Final Permutation Buffer (725);

(m) optionally performing inconsistency check in consistency check module (740).

Further, the present invention discloses further steps that the N-dimensional mesh creation occurs based on the input received from the initial permutation buffer (724) and growth function module (752, 852) and the mesh utilizes different states of permutations of the permutation cube; the permutation cubes being substituted as a virtual display and each state of permutation of the permutation cube being substituted as pixels.

Each permutation state in the created mesh reflects the permutation of the permutation cube; and the new permutations being the prime permutations obtained by applying the set of moves (M, 402) iteratively.

In accordance with the present invention advantages with respect to the present invention are:

(a) The present system provides solution to the problem of side-channel attacks by providing a random amount of computation and generating different random paths between two nodes (input and output nodes) for same input values for different iterations.
(b) The present invention provides easier circuit design and minimal overhead wherein the time and space complexities of the algorithm are polynomial bounded.
(c) The present invention provides solution and paves a way of creating Hardware Security Modules (HSMs) which could provide security to electronic devices from side channel attacks.
(d) The present invention masks the critical information with random amount of computation in such a way that random amount of power and electromagnetic reading is recorded by the potential attacker for the same operation at different iterations. The same method also provides a way where same operation takes a random amount of time to compute when performed in different iterations.
(e) The degree of randomness provided by the present invention is scalable, with comparatively very low overhead added.

While the present invention has been described with reference to one or more preferred aspects, which have been set forth in considerable details for the purpose of making a complete disclosure of the invention, such aspects are merely exemplary and are not intended to be limiting or represent an exhaustive enumeration of all aspects of the invention. The scope of the invention, therefore, shall be defined by the following claims. Further, it will be apparent to those skill in the art that numerous changes may be made in such details without departing from the spirit and the principles of the invention.

The various embodiments described above can be combined to provide further embodiments. All of the U.S. patents, U.S. patent application publications, U.S. patent applications, International (PCT) patent applications referred to in this specification and/or listed in the Application Data Sheet including but not limited to PCT/IB2020/062104, filed Dec. 17, 2020, are incorporated herein by reference, in their entirety.

I claim:

1. A docking method comprising:
   (a) receiving an outside input message;
   (b) assigning at least one permutation state to the outside input message;
   (c) storing at least one prime permutation state in at least one permutation buffer;
   (d) storing at least one growth function in a growth function storage;
   (e) receiving, at a mesh formation module, the at least one growth function as an input from a growth function logic module;
   (f) creating at least one N-dimensional mesh in the Mesh Formation Module, wherein the at least one N-dimensional mesh is formed for the at least one prime permutation state using the at least one growth function;
   (g) storing the at least one N-dimensional mesh in a Mesh Storage Buffer;
   (h) receiving, at an operation module, an input from the mesh storage buffer and an input from an operation storage buffer;
   (i) performing a plurality of operations on the input received from the mesh storage buffer in the operation module, wherein the plurality of operations includes selection of a specified set of permutation states from all the permutation states defined in the at least one N-dimensional mesh; and
   (j) applying a set of moves to the at least one prime permutation state to create at least one new permutation state as output of the operation module, wherein the set of moves are associated with a solution of the specified set of permutation states that are selected from all the permutation states defined in the at least one N-dimensional mesh, wherein the selection of the specified set of permutation states from all the permutation states defined in the at least one N-dimensional mesh is specified by the input from the Operation Storage Buffer; and storing the at least one new permutation state in the at least one Permutation buffer.

2. The docking method of claim 1, wherein the value assignment module assigns at least one permutation state of at least one permutation puzzle to the outside input message.

3. The docking method of claim 1, wherein at least one N-dimensional mesh is created for next iteration of the execution of the same outside input message.

4. The docking method of claim 1, further comprising at least one of: changing permutation state or permutation states of the at least one prime permutation through the value assignment module if the system is inconsistent, re-assigning at least one new growth function to the at least one prime permutation through the value assignment module if the system is inconsistent, re-assigning at least one new growth method to the outside input message if the system is inconsistent, re-assigning new operations to be performed in the operation module to the at least one prime permutation if the system is inconsistent, re-assigning at least one new growth function to the outside input message through the value assignment module if the system is inconsistent, re-assigning new operations to be performed in the operation module to the outside input message through the value assignment module if the system is inconsistent, and re-assigning at least one new growth method to the at least one prime permutation if the system is inconsistent.

5. The docking method of claim 1, wherein the method comprises performing an inconsistency check in a consistency check module.

6. A system for implementing a docking method, comprising:
   (a) a hardware processor having a value assignment module, a mesh formation module and an operation module;
   (b) a permutation puzzle logic module is capable of changing at least one permutation state of at least one permutation puzzle;
   (c) a permutation storage stores the at least one permutation state of the at least one permutation puzzle;
   (d) at least one permutation buffer stores at least one prime permutation state;
   (e) the mesh formation module is connected to the at least one permutation buffer to receive an input from the at least one permutation buffer;
   (f) a growth function storage stores at least one growth function;
   (g) a growth function logic module is connected to the mesh formation module to send the at least one growth function as an input to the mesh formation module;
   (h) a mesh storage buffer;
   (i) the operation module is connected to the mesh storage buffer to receive an input from the mesh storage buffer;
   (j) an operation storage buffer;

(k) the operation module is connected to the operation storage buffer to receive an input from the operation storage buffer; wherein the value assignment module is connected to the growth function storage;

the mesh formation module of the hardware processor receives the input from the at least one Permutation Buffer and the input from the Growth Function Logic module to create at least one N-dimensional mesh, wherein the at least one N-dimensional mesh is formed for the at least one prime permutation state using the at least one growth function, wherein the at least one N-dimensional mesh is stored in the mesh storage buffer; and the operation storage buffer stores operations that contribute to the production of a set of moves that are to be applied to the at least one prime permutation state; the operations stored in the operation storage buffer dictate the selection of a specified set of permutation states from all the permutation states defined in the at least one N-dimensional mesh; after receiving the input from the Mesh Storage Buffer and the input from the Operation Storage Buffer, the operation module is capable of creating at least one new permutation state.

7. The system of claim 6, wherein the at least one new permutation state is the at least one prime permutation for the next iteration if the system is consistent.

8. The system of claim 6, wherein a consistency check module verifies the inconsistencies within the system.

9. The system of claim 6, wherein the system generates an output cipher-text for an input plain-text, wherein a different output cipher-text is outputted by the system for a different iteration of a processing of the input plain-text done by the system, wherein the system processes an outside input message to generate an output.

10. The system of claim 6, comprises:

the path taken by an electric signal to travel from one node to another node, associated with a processing of an outside input message done by the system is different for a different iteration of a processing of the outside input message done by the system, wherein the system processes the outside input message.

11. The system of claim 6, comprises:

the execution path of a program to travel from one point in the execution of the program to another point in the execution of the program, associated with the running of the program is different for a different iteration of the running of the program, wherein the system processes an outside input message.

12. The system of claim 6, comprises: signature of electromagnetic radiation associated with a processing of an outside input message done by the system is different for a different iteration of a processing of the outside input message done by the system, wherein the system processes the outside input message.

13. The system of claim 6, comprises: power consumption signature associated with a processing of an outside input message done by the system is different for a different iteration of a processing of the outside input message done by the system, wherein the system processes the outside input message.

14. The system of claim 6, comprises: acoustic signature associated with a processing of an outside input message done by the system is different for a different iteration of a processing of the outside input message done by the system, wherein the system processes the outside input message.

15. The system of claim 6, wherein the time taken by the system to process an outside input message is different for a different iteration of a processing of the outside input message done by the system, wherein the system processes the outside input message.

16. The system of claim 6, wherein the at least one new permutation state overwrites the value of the permutation buffer.

17. The system of claim 6, wherein the at least one new permutation state is stored in the final permutation buffer and if the system is consistent, the value of the final permutation buffer overwrites the value of the initial permutation buffer.

18. The system of claim 6, wherein the system generates an output message for an input message, wherein a different output message is outputted by the system for a different iteration of a processing of the input message done by the system, wherein the system processes an outside input message to generate an output.

19. The system of claim 6, wherein the system processes an outside input message, wherein the growth function logic module receives the at least one growth function as input from the growth function storage and generates an output, wherein the output is different in a different iteration of a processing of the outside input message done by the system.

* * * * *